United States Patent [19]

Stobbs et al.

[11] Patent Number: 5,011,113
[45] Date of Patent: Apr. 30, 1991

[54] FLUID CONTROL VALVE

[75] Inventors: Thomas J. Stobbs, West Allis; Kishor J. Patel, Mukowonago; Frank M. Fritz, Milwaukee; Dale A. Knutson, Nashotah; James P. Janecke, Waukesha, all of Wis.

[73] Assignee: Applied Power Inc., Butler, Wis.

[21] Appl. No.: 515,553

[22] Filed: Apr. 27, 1990

Related U.S. Application Data

[63] Continuation-in-part of Ser. No. 290,374, Dec. 29, 1988.

[51] Int. Cl.⁵ .............................................. F16K 31/06
[52] U.S. Cl. ........................... 251/129.16; 251/129.21; 251/359; 251/50; 251/333
[58] Field of Search ............... 251/129.16, 129.21, 251/359, 50, 333

[56] References Cited

U.S. PATENT DOCUMENTS

| | | |
|---|---|---|
| 881,060 | 3/1908 | Cook . |
| 2,297,535 | 9/1942 | Bryant . |
| 2,927,737 | 3/1960 | Zeuch et al. . |
| 4,368,755 | 1/1983 | King . |
| 4,529,165 | 7/1985 | Lerach ........................ 251/129.16 |
| 4,589,528 | 5/1986 | Axthammer et al. . |
| 4,610,424 | 9/1986 | Koppers et al. . |
| 4,690,374 | 9/1987 | Polach et al. ............. 251/129.16 X |
| 4,774,976 | 10/1988 | Janecke et al. . |
| 4,785,920 | 11/1988 | Knecht et al. . |
| 4,796,855 | 1/1989 | Sofianek . |

FOREIGN PATENT DOCUMENTS

| | | |
|---|---|---|
| 880369 | 10/1961 | Fed. Rep. of Germany . |
| 1242945 | 6/1967 | Fed. Rep. of Germany . |
| 58-112820 | 7/1983 | Japan . |
| 61-197832 | 9/1986 | Japan . |
| 2190461 | 7/1987 | United Kingdom . |

Primary Examiner—Arnold Rosenthal
Attorney, Agent, or Firm—Quarles & Brady

[57] ABSTRACT

A direct-operated, two-way solenoid valve is disclosed. The valve balances the hydraulic flow forces acting on a poppet in order to achieve fast-acting, high-flow operation. The valve has a housing with the poppet mounted in a main bore. The poppet has a sealing end with a longitudinal central bore that is open at the sealing end and terminates in a pressure wall. A radial cross bore in the poppet provides fluid communication between the central bore and an outlet port formed in the housing. The sealing end of the poppet may contact a valve seat to prevent fluid communication between an inlet port formed in the housing and the central bore of the poppet. The sealing end of the poppet is biased into contact with the valve seat to prevent fluid communication between the inlet port and the central bore. An actuator generating a magnetic flux path tends to move the poppet out of contact with the valve seat.

16 Claims, 5 Drawing Sheets

FLUID CONTROL VALVE

CROSS REFERENCES TO RELATED APPLICATIONS

This application is a continuation-in-part of application Ser. No. 290,374, filed Dec. 29, 1988, for a High Response, Compact Solenoid Two-Way Valve and assigned to the assignee of this application.

BACKGROUND OF THE INVENTION

The present invention relates generally to the art of fluid control valves. More specifically, the invention pertains to an improved direct operated, two-way solenoid valve for regulating the flow of hydraulic fluid, where the valve balances hydraulic forces to permit increased flow rates and produce fast acting operation at reduced noise levels.

Hydraulic shock absorbers are used in vehicle suspension systems to dampen spring oscillations caused by uneven road surfaces or vehicle accelerations. The shock absorbers commonly include a piston slidably mounted within a cylinder. Dampening occurs as fluid is forced through orifices and relief and check valves of the shock absorber.

Shock absorbers have also included electro-magnetic valves which provide a parallel flow path through the chambers of the shock absorber. See e.g., U.S. Pat. No. 4,785,920 issued Nov. 22, 1988, entitled "Hydraulic Adjustable Shock Absorber" and German Pat. No. 1,242,945, issued June 22, 1967. These electro-magnetic valves are located within bypass connections between the working chambers of the shock absorber. Fluid flow through the bypass connection has been selectively controlled by opening or closing the valve.

Hydraulic flow forces within this type of valve increase dramatically in response to an increase in the flow rate through the valve. Small, fast-acting valves are generally limited to a low range of flow rates because their operation is adversely affected by intense hydraulic forces. Alternatively, present valves capable of high flow rates are designed with large housings and components.

It can therefore be seen that a need exists for an improved electromagnetic valve that is small and capable of relatively large flow rates. It can also be seen that such a valve should also be able to shift quickly between open and closed positions without generating significant noise levels.

SUMMARY OF THE INVENTION

The invention is embodied within a valve having a housing with a main bore and an end portion. The housing also has inlet and outlet ports in communication with the main bore. A poppet having a sealing end and an opposite end is slidably mounted in the main bore. A longitudinal central bore of the poppet is open at the sealing end and terminates in a pressure wall. A radial cross bore of the poppet provides fluid communication between the central bore and the outlet port. A valve seat is sized to receive the sealing end of the poppet and prevent fluid communication between the inlet port and the central bore when the sealing end of the poppet is in contact with the valve seat. The poppet is positionally biased within the main bore so that when the sealing end contacts the valve seat, the opposite end is spaced apart from the end portion of the housing. The space between the opposite end of the poppet and the end portion of the housing forms a damping chamber. The valve allows fluid to be channeled into the damping chamber. An actuator is operable in response to an input current to produce a magnet flux path tending to move the poppet out of contact with the valve seat.

This aspect of the invention provides a valve which is normally closed to fluid flow due to the position of the poppet. In the closed position, the sealing end of the valve contacts the valve seat to prevent fluid from the inlet port passing into the central bore of the poppet. The actuator can move the poppet and open the valve in response to an input current. In the open position, fluid flows into the central bore from the inlet port. The fluid then flows longitudinally through the central bore of the poppet until encountering the pressure wall. Fluid is diverted radially outward through the cross bores and to the outlet port. Thus, the valve provides fluid flow from the inlet port to the outlet port in response to energization of the actuator.

As further detailed below, once the valve is open, the structure of the valve balances the hydraulic flow forces acting on the poppet. Balancing the hydraulic flow forces allows the poppet to be easily and quickly controlled, and permits the valve to be operated at increased flow rates (compared to similar size valves). The valve is capable of shifting quickly between open and closed positions. The balancing of fluid forces acting on the poppet also permits the input current to the actuator to be substantially reduced once the poppet moves out of contact with the valve seat.

In another aspect of the invention, the sealing end of the poppet has an outer beveled edge and the valve seat has a frusto-conical surface. The surface is designed to engage the beveled edge and thereby prevent fluid communication between the inlet port and the central bore when the beveled edge is in contact with the frusto-conical surface. This aspect establishes a line seal between the poppet and the valve seat that simplifies the expensive machining usually required for the valve components. The line seal is less sensitive to contamination, viscosity changes and fluid flow forces. In a preferred design, the beveled edge is formed with an angle of 30° and the surface is formed with an angle of 45°. This reduces the fluid flow forces acting on the poppet.

In another aspect, the valve seat is formed in a sealing ring that is capable of limited radial movement relative to the housing. The movable sealing ring assures that the poppet and the valve seat meet in proper alignment to form a line seal. If only one portion of the sealing end of the poppet initially contacts the valve seat, the sealing ring is forced by the poppet to a position that achieves a full sealing contact. The proper seal may be achieved even where the poppet is skewed slightly within the main bore of the housing. The movable valve seat can thus make up for imperfections in the machining or the alignment of the valve components.

In another aspect, the housing includes an expanded bore portion and the valve has an armature fastened to the poppet and movable within the expanded bore portion. The magnetic flux path resulting from energization of the actuator passes through the armature. A pair of orifices extend through the armature to channel fluid from one end of the armature to the other. This aspect permits control over the speed at which the poppet shifts from the closed position to the open position. As the poppet moves away from the valve seat, fluid in the damping chamber must be expelled through the orifices.

This slows slightly the opening of the valve, and as a result, reduces the noise generated by rapidly opening the valve. The size of the orifices may be modified to change the speed at which the valve opens.

In another aspect, the valve includes a sensing pin fastened to the pressure wall of the poppet. The sensing pin projects into the central bore of the poppet. Conduits formed in the sensing pin provide fluid communication between the central bore and the damping chamber. One conduit is a radial bore that is axially aligned with the radial cross bores of the poppet. This aspect of the invention also acts to balance the hydraulic flow forces acting on the poppet. A momentum force may be generated on the opposite end of the poppet which tends to offset the momentum force acting on the pressure wall and the head of the sensing pin. The magnitude of the offsetting momentum force may be modified by modifying the position of the radial bore.

Thus, it is an object of the invention to provide a fluid control valve that is normally closed but which can be opened quickly to provide fluid flow in response to an electrical input signal.

It is another object of the invention to provide a fluid control valve having a structure which balances the hydraulic flow forces acting on the movable poppet member of the valve.

It is another object of the invention to provide a compact electromagnetic valve that is capable of operating at relatively high fluid flow rates.

It is another object of the invention to provide a fast-acting electromagnetic valve that minimizes the amount of noise that is produced as a result of fluid flow and physical contact of components within the valve.

It is still another object of the invention to provide an electromagnetic valve that achieves a line seal to reduce fluid leakage rates when the valve is de-energized, even if valve components are slightly misaligned.

It is another object of the invention to provide an electromagnetic valve that is compact and relatively inexpensive and efficient to manufacture and assemble.

The foregoing and other objects and advantages of the present invention will appear from the following description. In the description, reference will be made to the accompanying drawings which illustrate preferred embodiments of the present invention. These embodiments do not represent the full scope of the invention. Reference should therefore be made to the claims herein for interpreting the full scope of the invention.

DETAILED DESCRIPTION OF THE PREFERRED EMBODIMENTS

Figure 1:
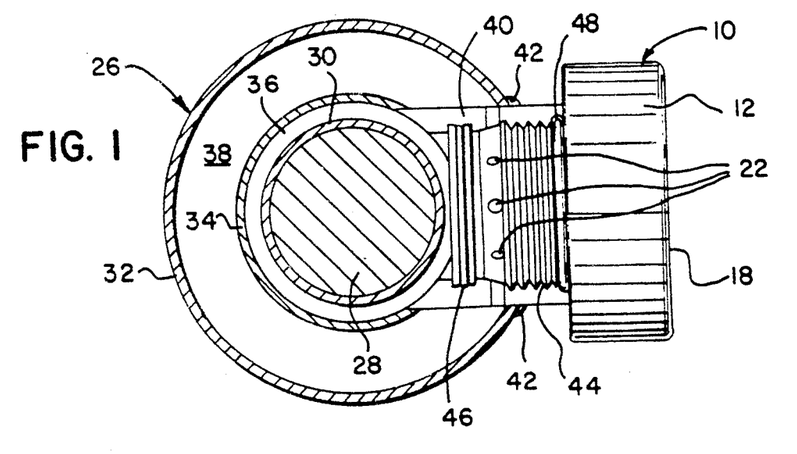
FIG. 1 is a view partially in section of a hydraulic shock absorber incorporating a fluid control valve embodying the present invention.
Figure 2:
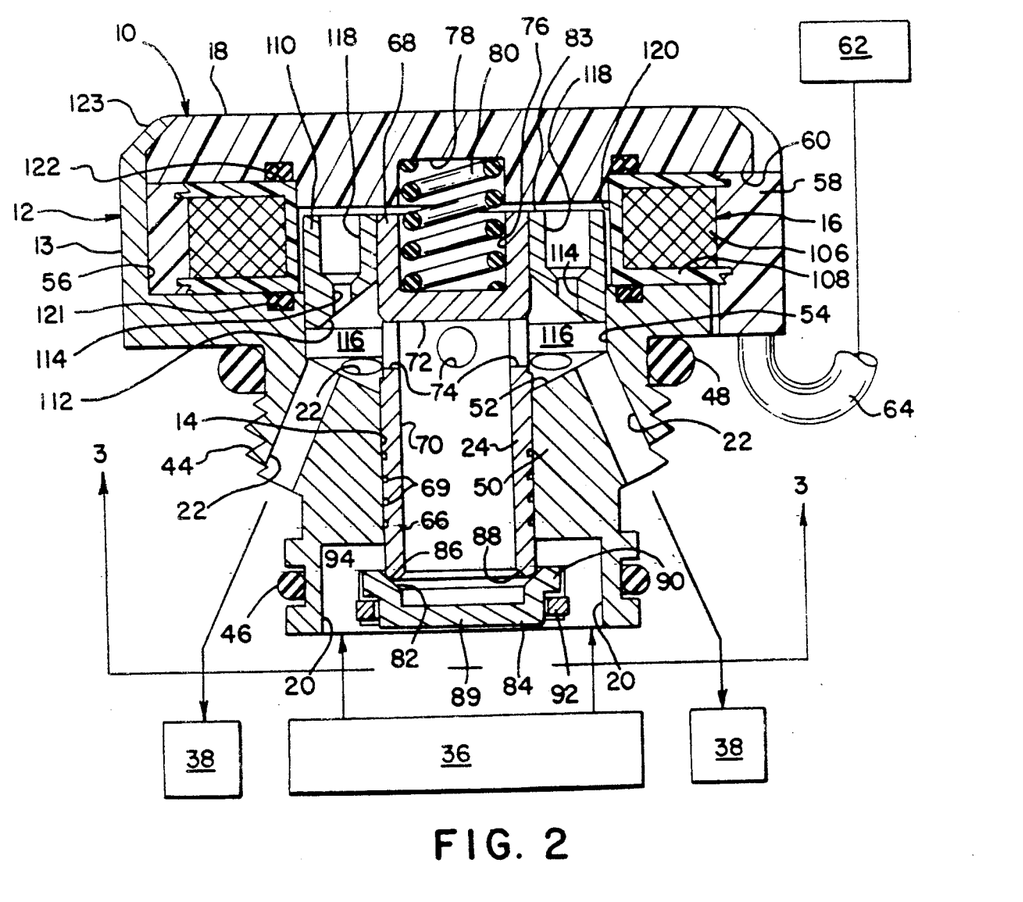
FIG. 2 is a view in section of the valve shown in FIG. 1.
Figure 3:
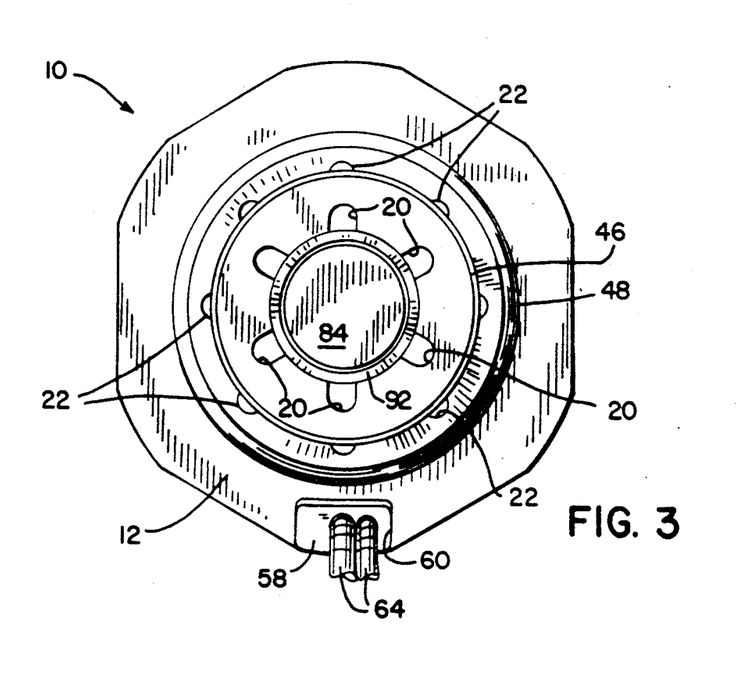
FIG. 3 is an enlarged end view taken along line 3—3 of FIG. 2.

Referring to FIGS. 1-3, a fluid control valve 10 according to the present invention includes a housing 12 having a body portion 13 and a cap or end portion 18. The body portion 13 has a central coaxial main bore 14. An actuator 16 is positioned inside the body portion 13 and is sealed by the end portion 18. The housing body 13 includes fluid inlet ports 20 and fluid outlet ports 22 which are in communication with the main bore 14. Fluid flow from the inlet ports 20 to the outlet ports 22 is regulated by the position of a poppet 24 which is slidably mounted within the main bore 14 of the housing 12. The position of the poppet 24 is determined in part by the status of the actuator 16.

The valve 10 may be mounted in a vehicle shock absorber 26 as shown schematically in FIG. 1. The shock absorber 26 includes a piston 28 mounted within an inner cylinder 30. The shock absorber 26 has an outer cylinder 32 and an intermediate cylinder 34 mounted between the inner and outer cylinders 30 and 32. A cavity 36 formed between the inner cylinder 30 and the intermediate cylinder 34 generally contains high pressure fluid. Conversely, a cavity 38 formed between the intermediate cylinder 34 and the outer cylinder 32 generally contains low pressure fluid.

The valve 10 is secured to a mounting member 40 which is itself secured to the shock absorber 26 by welds 42. Threads 44 formed in the housing 12 engage mating threads on the mounting member 40. Through this connection, the inlet ports 20 are open to the high pressure cavity 36 and the outlet ports 22 are open to the low pressure cavity 38. O-ring 46 prevents fluid communication from the high pressure cavity 36 to the lower pressure cavity 38 other than through the valve 10. Another O-ring 48 prevents fluid from exiting the shock absorber 26 between the mounting member 40 and the valve 10.

The housing 12 has a central land 50 which defines the size of the main bore 14. A tapered wall 52 extends between the main bore 14 and an enlarged bore portion 54 of the housing 12. There are eight outlet ports 22 (FIG. 3) that intersect the tapered wall 52 adjacent the enlarged bore 54, although the exact number of outlet ports may vary. The housing 12 also includes a recessed portion 56 to house the disc-shaped actuator 16. A connector 58 positioned within an opening 60 in the housing 12 electrically connects the actuator 16 to a control unit 62 through electrical leads 64.

The poppet 24 has a sealing end 66 and an opposite end 68. Pressure balancing grooves 69 located on the outside of the poppet 24 aid in centering the poppet within the main bore 14. A central coaxial bore 70 of the poppet 24 is open at the sealing end 66 and extends longitudinally through the poppet until terminating in a pressure wall 72. The poppet 24 also includes four radial cross bores 74 located adjacent the pressure wall 72. At the opposite end 68 of the poppet 24, a spring chamber 76 is aligned with a recess 78 in the end portion 18 of the housing 12. A spring 80 is mounted in the spring chamber 76 and the recess 78 to bias the poppet 24 away from the end portion 18. A damping chamber 83 is formed between the opposite end 68 of the poppet 24 and the end portion 18 of the housing 12.

The spring 80 biases the sealing end 66 of the poppet 24 against a valve seat 82 formed in a sealing ring 84. The sealing end 66 of the poppet 24 includes a beveled lip 86 (best shown in FIG. 4) forming an angle of 30° with the horizontal (perpendicular to the longitudinal axis of the poppet 24). The sealing end 66 is also formed with an inner tapered surface 88 radially inward of the beveled lip 86. The valve seat 82 is a frusto-conically shaped surface forming an angle of 45° with the horizontal. When the poppet 24 is positioned against the sealing ring 84, the beveled lip 86 and the valve seat 82 form a line seal to prevent fluid communication between the inlet ports 20 and the central bore 70 of the poppet 24. Thus, fluid may enter the central bore 70 from the inlet ports 20 only when the poppet 24 is not in contact with the sealing ring 84 (as illustrated in FIG. 4).

Figures 4, 5, 6:
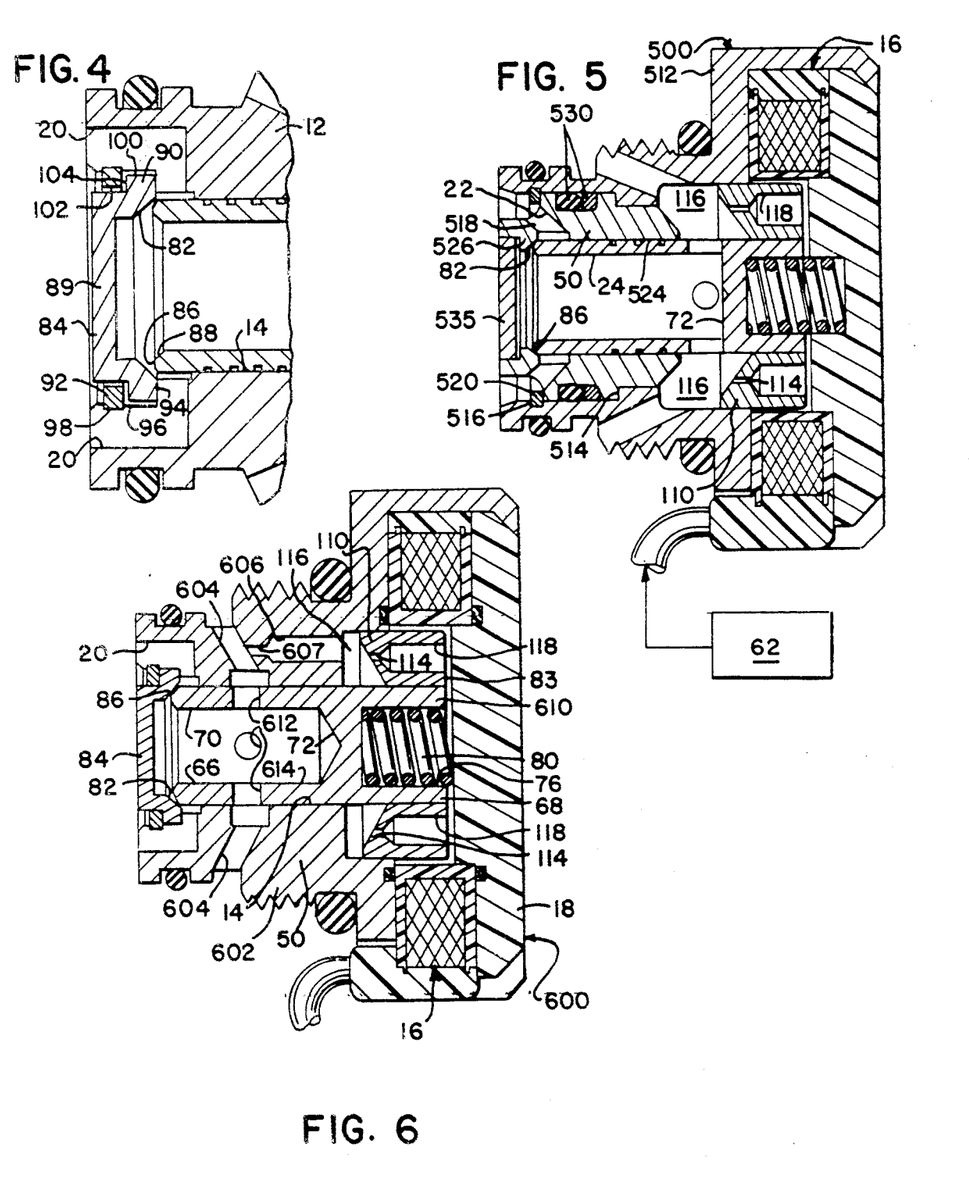
FIG. 4 is an enlarged view in section of a portion of the valve shown in FIG. 2, but showing the valve in an open position.
FIG. 5 is a view in section of a valve illustrating a second embodiment of the invention.
FIG. 6 is a view in section of a valve illustrating a third embodiment of the invention.

Referring to FIGS. 2 and 4, the sealing ring 84 has a body portion 89 and a radial flange 90. The radial flange 90 is trapped between a retaining ring 92 and a ledge portion 94 of the housing 12. The ledge 94 is formed between an axial wall 96 and the main bore 14 of the housing 12. The retaining ring 92 is mounted in a groove 98 formed in the housing 12. This arrangement creates gaps 100, 102 and 104 (FIG. 4) which give the sealing ring 84 limited axial and radial movement relative to the housing 12. Gap 100 is formed between the radial flange 90 and the axial wall 96, and gap 102 is formed between the body portion 89 and the retaining ring 92. Gap 104 is formed between the retaining ring 92 and the radial flange 90. Fluid from the high pressure cavity 36 acts on the outside of the body portion 89 and presses the flange 90 against the ledge 94.

Movement of the poppet 24 away from the sealing ring 84 is controlled by the actuator 16. Input current from the control unit 62 is transmitted to a coil 106 which is wound in a spool-shaped bobbin member 108 formed of a plastic material. The connector 58 is formed by an injection molding process and attaches to the bobbin 108. The connector 58 encloses the ends of the electrical leads 64 and encapsulates the coil 106.

The actuator 16 includes a disc armature 110 that is formed of a metal material and press fit or otherwise suitably fastened around the poppet 24. The annular-shaped armature 110 moves within the enlarged bore 54 in response to current in coil 106 which causes movement of the poppet 24. There is preferably a very slight clearance between the armature 110 and the enlarged bore 54. The armature 110 has a concave sloping surface 112 radially outward of the poppet 24. A pair of orifices 114 provide fluid communication between an open area 116 and cavities 118 that are formed in the armature 110. The cavities 118 are open to the damping chamber 83.

Fluid from the damping chamber 83 may contact a face 120 of the bobbin 108. One elastomeric seal 121 is positioned in a groove in the body portion 13 to prevent leakage between the bobbin 108 and the body portion. A second elastomeric seal 122 is positioned in a groove in the end portion 18 to prevent fluid leakage between the bobbin 108 and the end portion 18.

The valve 10 is normally closed to fluid flow when no current is supplied to the coil 106. In the absence of an electromagnetic force generated by the actuator 16, the spring 80 biases the poppet 24 away from the end portion 18 and into contact with the sealing ring 84. When the valve 10 is closed, fluid from the high pressure cavity 36 that is in the inlet ports 20 cannot flow into the central bore 70 of the poppet 24. The fluid encounters the outside of the poppet 24 and the line seal between the poppet and the sealing ring 84. With the valve 10 is closed, there are no hydraulic forces tending to move the poppet 24 away from the sealing ring 84.

The movable sealing ring 84 assures that a proper line seal is formed between the beveled lip 86 and the valve seat 82. If the poppet 24 were slightly off center within the main bore 14, one portion of the sealing end 66 would contact the valve seat 82 before the entire sealing end came into full contact. With the movable sealing ring 84, the portion of the beveled lip 86 that initially contacts the valve seat 82 will ride down the valve seat and cause the sealing ring 84 to move radially in the direction of initial contact. The sealing ring 84 is free to move radially due to gaps 100 and 102 (FIG. 4). Thus, a full line seal may be achieved even where the poppet 24 is slightly off center. The movable sealing ring 84 is also advantageous where production capabilities cannot assure that the beveled lip 86 and the valve seat 82 will be mounted in the valve 10 exactly in their desired positions.

The valve 10 opens in response to an input current generated by the control unit 62. Initially, a boosted current is supplied to the actuator 16 to overcome the force of the spring 80. The boosted current is also necessary to overcome the relatively large gap that exists (when the valve 10 is closed) between the opposite end 68 of the poppet 24 and the end portion 18 of the housing 12. The input current establishes a flux path passing through the armature 110 and portions of the housing 12 and end portion 18. The electromagnetic force tends to move the poppet 24 out of contact with the valve seat 82.

When the valve 10 is open, fluid from the high pressure cavity 36 enters the valve 10 through the inlet ports 20. The fluid moves radially inward between the sealing end 66 of the poppet 24 and the sealing ring 84. The beveled lip 86 and the inner taper 88 provide a smooth fluid flow path as the fluid enters the central bore 70 of the poppet 24. The fluid turns and travels longitudinally through the central bore 70. The fluid encounters pressure wall 72 and exits the central bore 70 by moving radially outward through the cross bores 74. The fluid is then in the area 116 at a reduced pressure. The fluid from area 116 enters the low pressure cavity 38 through outlet ports 22. As the valve 10 opens, fluid in the damping chamber 83 that is displaced by the poppet 24, passes through cavities 118 and orifices 114.

Once the valve 10 is open, the structure of the valve tends to balance the hydraulic forces acting on the poppet 24. These forces and their relationships are set forth in the following equation:

$$F_{spring} + F_{Bernoulli} = F_{coil} + F_{momentum} + F_{differential\ pressure} \quad \text{Equation 1}$$

The spring and Bernoulli forces acting on the poppet 24 tend to close the valve 10. The spring force increases as the poppet 24 moves away from the sealing ring 84 and the spring 80 compresses. The Bernoulli force is generated by fluid flowing into the central bore 70 of the poppet 24. The force results as fluid from the inlet ports 20 passes between the sealing end 66 and the sealing ring 84. The 30° angle of the beveled lip 86 and the 45° angle of the valve seat 82 cause the radially inward fluid jet to flow adjacent the sealing end 66 of the poppet 24. This reduces the resulting low pressure zone and thus minimizes the magnitude of the Bernoulli force. Like the spring force, the Bernoulli force tends to close the valve 10.

The spring and Bernoulli forces are balanced by the coil, momentum and differential pressure forces which tend to open the valve 10. The coil force is the electromagnetic force generated by energization of the coil 106 that continues to urge the poppet 24 away from sealing ring 84. When the poppet 24 approaches the end portion 18 of the housing 12, the level of input current supplied to the actuator 16 may be reduced to a holding current, which may be approximately $\frac{1}{4}$ to 1/5 of the boosted current. The current reduction is possible because the gap between the opposite end 68 of the poppet 24 and the end portion 18 is smaller (or no gap) and the forces acting on the poppet are balanced as suggested by Equation 1.

The momentum force is generated as the fluid travels longitudinally through the central bore 70. The fluid encounters the pressure wall 72 and creates a pressure field adjacent the pressure wall. The mass of the fluid meeting the pressure field and the pressure wall 72 creates an momentum force tending to move the poppet 24 away from the sealing ring 84. The momentum force also results from fluid encountering the sloping surface 112 of the armature 110.

The flow of fluid through the valve 10 also generates a differential pressure force. The fluid exits the central bore 70 by traveling radially outward through the cross bore 74. The fluid undergoes a pressure change as it travels between the central bore 70 and the area 116. The lower pressure fluid of area 116 is in communication with the fluid in the damping chamber 83 due to orifices 114 and cavities 118. Thus, a higher pressure acts on pressure wall 72 while a lower pressure acts on the opposite end 68 of the poppet 24. This pressure difference generates a force on the poppet 24 tending to move the poppet in the direction of the end portion 18.

The flow balancing feature of the valve 10 allows the valve to operate at high flow rates with lower currents supplied to the coil 106, compared to similar size valves. The balancing effect further allows the poppet 24 to respond rapidly to changes in the input signal from the control unit 62, because the required coil inductance is relatively low. Thus, the valve is capable of shifting between open and closed modes in extremely fast time intervals.

The valve 10 is also designed to minimize the undesirable noise generated by rapid pressure changes within the valve 10. The valve 10 employs the restricted orifices 114 between the area 116 and the damping chamber 83. The orifices 114 produce a dash pot effect which slows the opening of the valve 10. As the poppet 24 moves away from the sealing ring 84, fluid within the damping chamber 83 and the cavities 118 passes through the orifices 114 and into the area 116. The poppet movement decreases the volume of the damping chamber 83. The fluid movement from the damping chamber 83 and cavities 118 decreases the shifting speed of the poppet 24 by creating a momentary damping force in chamber 83. This decreased shifting speed beneficially minimizes the noise created by rapid pressure changes within the shock absorber pressure chamber and by contact between the poppet 24 and the end portion 18 of valve 10.

The shifting speed of the poppet 24 may be controlled by modifying the size of the orifices 114. Where shifting speed of the valve 10 is critical and noise is acceptable, much larger orifices could be used. The cavities 118 are used in combination with the orifices 114 so that the axial length of the orifices 114 within the armature 110 is relatively short. This lessens the sensitivity of the valve 10 to changes in fluid temperature.

To a lesser extent, the orifices 114 also tend to slow the poppet 24 as it shifts from the open position to the closed position. The volume of the damping chamber 83 increases as the poppet 24 moves toward the sealing ring 84. A vacuum condition is created and fluid from area 116 is drawn into the damping chamber 83 through orifices 114 and cavities 118. The orifices 114 tend to slow the fluid flow and the movement of the poppet 24. This reduces the noise associated with rapid pressure changes within the shock absorber pressure chamber and the noise of the poppet 24 contacting the sealing ring 84 within the valve 10.

A further advantageous feature of the valve 10 is its compactness. The valve 10 incorporates fewer components than prior valves. The face 120 of the bobbin 108 is used as a sealing surface for fluid within the damping chamber 83. This eliminates the need for steel plates which were often used to isolate the electro-magnetic actuator mechanism from fluid. The present valve 10 employs elastomeric seals 121 and 122 against the bobbin 108 to prevent fluid leakage past the actuator 16. The valve 10 is also beneficially designed with a relatively thin rim 123. After mounting the components within the valve 10, the thin rim 123 is crimped over the end portion 18 of the housing 12 to seal the valve. The rim 123 eliminates the need for a threaded connection between the end portion 18 and the body portion 13.

An alternate embodiment of the invention is shown in FIG. 5. Throughout the description, components the same as those previously described have the same reference numeral. The valve 500 of FIG. 5 has a housing 512 and a regulating poppet 24. The valve 500 has an actuator 16 responsive to a control unit 62 to establish a magnetic flux path through armature 110 and thereby move poppet 24 within the housing 512.

The housing 512 is formed with a shoulder 514 and a groove 516. An insert 518 is positioned in the housing 512 against the shoulder 514. A snap ring 520 is positioned within the groove 516 to hold the insert 518 against the shoulder 514. The insert 518 includes a land portion 50 which defines a main bore 524. A sealing ring portion 526 of the insert 518 has a frusto-conical valve seat 82 which is sized to receive the beveled lip 86 of the poppet 24. A sealing plate 535 is attached to the sealing ring portion 526 of the insert 518. Channels are formed through the insert 518 to define inlet ports 22. Seals 530 are positioned between the insert 518 and the housing 512 to eliminate flow between the insert and the housing.

The valve 500 of FIG. 5 operates according to Equation 1 in the same manner as valve 10 shown in FIGS. 1-3. The insert member 518 both defines the bore 524 for the poppet 24 and creates the valve seat 82 for the poppet. The sealing ring portion 526 of the valve 500 is not permitted the radial movement as sealing ring 84 in the previous valve 10.

Valve 600 of FIG. 6 represents another embodiment of the invention. The valve 600 includes a housing 602 having a main bore 14 and a central land 50. In this embodiment, outlet ports 604 intersect the main bore 14 through the central land 50 (rather than intersecting area 116 as in previous embodiments). The housing 602 also includes a passage 606 which provides a fluid communication between the outlet ports 604 and area 116 adjacent armature 110. The passage 606 includes an orifice 607.

A poppet 610 of the valve 600 has a sealing end 66 and an opposite end 68. A central bore 70 of the poppet 610 is open at the sealing end 66 and terminates in a pressure wall 72. The poppet 610 has radial cross bores 612 which are aligned with the outlet ports 604 of the housing 602. The cross bores 612 are spaced apart from the pressure walls 72 to form a longitudinal wall 614 between the cross bores 612 and the pressure wall 72. Spring 80 is positioned in a spring chamber 76 and loaded between the poppet 610 and the end portion 18.

Valve 600 is designed to balance the hydraulic flow forces acting upon the poppet 610 according to Equation 1. In this embodiment, the pressure differential force results because the fluid undergoes a pressure drop as it passes through the cross bores 612 and enters the outlet ports 604. The lower pressure fluid is in communication with the fluid in the damping chamber 83 due to passage 606, area 116, orifices 114 and cavities 118. The fluid pressure acting on the opposite end 68 of the poppet 610 is thus less than that acting on pressure wall 72.

Valve 600 is also designed to control the speed at which the poppet 610 shifts between open and closed positions. The shifting speed of the valve 600 is controlled by orifices 114. As the poppet 610 leaves contact with the sealing ring 84 in response to energization of the actuator 16, a portion of the fluid in the damping chamber 83 and cavities 118 passes through orifices 114. This slows shifting of the poppet 610 and minimizes the noise associated with rapid pressure changes in the shock absorber pressure chamber and the mechanical contact within the valve 600. The closing speed of the poppet 610 is also affected by orifices 114 as fluid is drawn into the damping chamber 83 to fill the void created by the closing poppet.

The valve 600 also includes the passage 606 with orifice 607 that may be sized to reduce the speed at which the poppet 610 moves in response to energization and de-energization of the actuator 16. As the valve 600 opens, fluid is forces from the damping chamber 83, through the orifices 114 and into area 116. The fluid must also flow through passage 606 and orifice 607 to the outlet port 604. Upon de-energization of the actuator 16, the spring and Bernoulli forces will exceed the momentum and differential pressure forces, thereby causing the poppet 610 to move toward the sealing ring 84. The area within the damping chamber 83 vacated by the poppet 610 will create a vacuum condition. Fluid will be drawn into the damping chamber 83 through orifices 114. As the volume of area 116 decreases due to movement of the poppet 610, fluid may also be forced from area 116 through passage 606 if the fluid in chamber 83 cavitates. Orifice 607 thus provides greater control over the shifting speed of the poppet 610. In the same manner as the size of armature orifices 114 control the shifting speed of the poppet 610, the size of orifice 607 may also be set to control the speed of fluid flow and poppet movement. Thus, the valve 600 incorporates two conduits (orifices 114 and orifice 607) that are useful to slow the shifting speed of the poppet 610.

Figure 7:
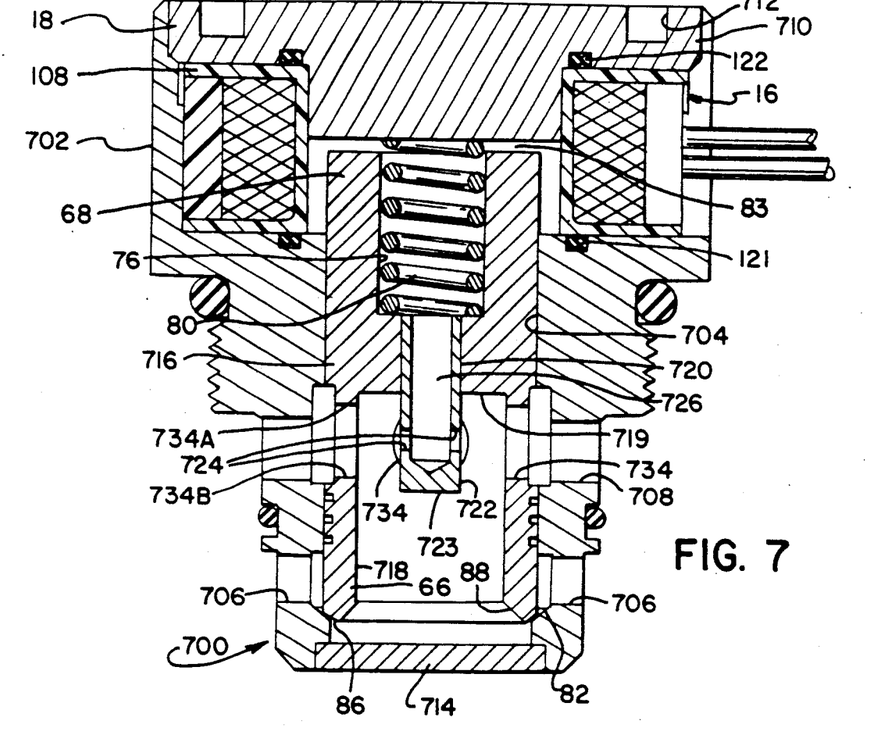
FIG. 7 is a view in section of a valve illustrating a fourth embodiment of the invention.

A further embodiment of the invention is illustrated by valve 700 of FIG. 7. A housing 702 for the valve 700 has a main bore 704 with inlet and outlet ports 706 and 708 in communication with the main bore. Although the inlet ports 706 exit through the side of the valve 700, the valve can be mounted to the shock absorber 26 in the same manner as previously described because the valve is slightly longer than previous embodiments. The housing 702 is sized to receive an actuator 16 and threadably receive a cap or end portion 18. A bobbin 108 of the actuator 16 is positioned between the body of the housing 702 and the end portion 18. Wrench openings 712 are used to rotatably insert the threads 710 of the end portion 18 into the body of the housing 702. Elastomeric seals 121 and 122 are used on opposite sides of the bobbin 108 to prevent fluid loss past the actuator 16.

Opposite the end portion 18, the main bore 704 is sealed by a sealing plate 714 that is welded or otherwise suitably fastened to the housing 702. A poppet 716 is slidably mounted within the main bore 704. The poppet 716 has a sealing end 66 and an opposite end 68. A central bore 718 is open at the sealing end 66 and extends longitudinally to a pressure wall 719. Radial cross bores 734 provide fluid communication between the central bore 718 and the outlet ports 708. The edge or portion of the the cross bores 734 nearest the pressure wall 719 is designated 734A and the edge or portion furthest the pressure wall is designated 734B. The poppet 716 also includes a spring chamber 76 which houses a spring 80 loaded between the poppet and the end portion 18 of the housing 702. The poppet 716 has a longitudinal opening 720 between the pressure wall 719 and the spring chamber 76.

A sensing pin 722 is press fitted or otherwise suitably mounted within the opening 720 in the poppet 716. The sensing pin 722 projects into the central bore 718 of the poppet 716 and terminates in a head portion 723. The sensing pin 722 includes radial holes 724 and an axial hole 726 which provide fluid communication between the central bore 718 of the poppet 716 and the spring chamber 76. The radial holes 724 are axially positioned midway between the opposite portions 734A and 734B of the poppet cross bores 734.

Valve 700 is designed for handling large fluid flow rates. The poppet 716 is slidable within the main bore 704 between a closed position and an open position. In the closed position, the beveled lip 86 of the poppet 716 forms a line seal against the valve seat 82 to prevent flow through the valve 700. In the open position, fluid from the inlet ports 706 enters radially between the valve seat 82 and the sealing end 66 of the poppet 716. The fluid turns past the inner tapered surface 88 and flows longitudinally through the central bore 718. A portion of the fluid is channelled into the radial holes 724 of the sensing pin 722. This fluid is in communication with fluid in axial hole 726, spring chamber 76 and damping chamber 83. The fluid is directed radially outward through the cross bores 734 and outlet ports 708 to the low pressure cavity 38 (FIGS. 1 and 2).

The valve 700 is structured to balance the hydraulic forces acting on the poppet 716. Those forces are represented by the following equation:

$$F_{spring} + F_{Bernoulli} + (F_{momentum} \times K) = F_{coil} + F_{momentum} \quad \text{Equation 2}$$

The spring and the coil forces operate in the same manner as discussed in relation to other embodiments of the valve. The spring 80 is loaded between the poppet 716 and the end portion 18 of the housing 702 to bias the poppet 716 against the valve seat 82. In response to an input current from the control unit 62, the actuator 16 generates a magnetic flux path passing through the poppet 716 and tending to move the poppet 716 away from the valve seat 82. The poppet 716 is formed of a low reluctance, ferro-magnetic material such as iron, and is drawn toward the end portion 18 of the housing 702 upon energization of the actuator 16. The control unit 62 initially generates a boosted input current to open the valve 700. After a brief period, a smaller holding current is sufficient to maintain the poppet 716 against the end portion 18 of the housing 702 because the distance between the poppet 716 and the end portion 18 of housing 702 is reduced to zero and the structure of the valve 700 generally balances the hydraulic flow forces acting on the poppet.

The Bernoulli force is generated as the fluid passes between the sealing end 66 of the poppet 716 and the valve seat 82. The Bernoulli force acts in a direction tending to move the poppet 716 toward the valve seat 82. The angles of the beveled lip 86 and the valve seat 82 reduce the Bernoulli force.

The momentum force on the right hand side of Equation 2 tends to open the poppet 716. As fluid flows through the central bore 718, pressure fields develop adjacent the head 723 of the sensing pin 722 and adjacent the pressure wall 719. The momentum force results as the mass of the fluid encounters the pressure wall 719, the pin head 723 and the pressure fields.

A force represented in Equation 2 as ($F_{momentum} \times K$) tends to move the poppet 716 toward contact with the valve seat 82. This force results because the sensing pin 722 channels a portion of the momentum force field to the opposite end 68 of the poppet 716. The magnitude of the force depends on the position of the radial holes 724 relative to the cross bores 734 of the poppet 716, because the pressure field varies in intensity away from the pressure wall 719. The maximum intensity occurs near the portions 734A of the cross bores which are closest to the pressure wall 719. Moving away from the pressure wall 719, the pressure field intensity diminishes to a minimum near the furthest portion 734B of the cross bores.

The position of the radial holes 724 of the sensing pin 722 within the pressure field gradient determines the amount of momentum force acting on the opposite end 68 of the poppet 716. In Equation 2, the value of K represents the relative position of the radial holes 724 between the opposite portions 734A and 734B of the cross bores. The value of K may vary between 100% (radial holes 724 axially aligned with 734A) and 0% (radial holes 724 axially aligned with 734B) depending on the axial position of the radial holes 724. In the embodiment illustrated in FIG. 7, the radial holes 724 are approximately midway between the opposite portions 734A and 734B of the cross bores, and the value of K would be about 50%. Therefore, the momentum force acting on the pressure wall 719 and head 723 is partially counteracted by a momentum force of approximately half the magnitude acting on the opposite end 68 of the poppet 716.

The location of the sensing pin 722 may be adjusted to achieve different momentum force balances. If the sensing pin 722 were positioned further inside opening 720 so that the radial holes 724 were axially aligned with portion 734A (K about 100%), the opposite end 68 of the poppet 716 would experience approximately the complete momentum force. In effect, the momentum force would be applied to both ends of the poppet 716 and there would be a reduced or minimal momentum force acting on the poppet. By comparison, if the sensing pin 722 were positioned so that the radial holes 724 were in axial alignment with portion 734B (K about 0%), almost no momentum force would be directed to the opposite end 68 of the poppet 716. In this case, the full momentum force would tend to open the poppet 716.

Fluid is directed radially outward through the cross bores 734 and the outlet ports 708. The fluid undergoes a pressure drop as it exits the radial cross bores 734. Because the fluid is channeled to the chamber 83 before undergoing a pressure drop, however, there is no pressure differential force acting on the poppet 716.

Figure 8:
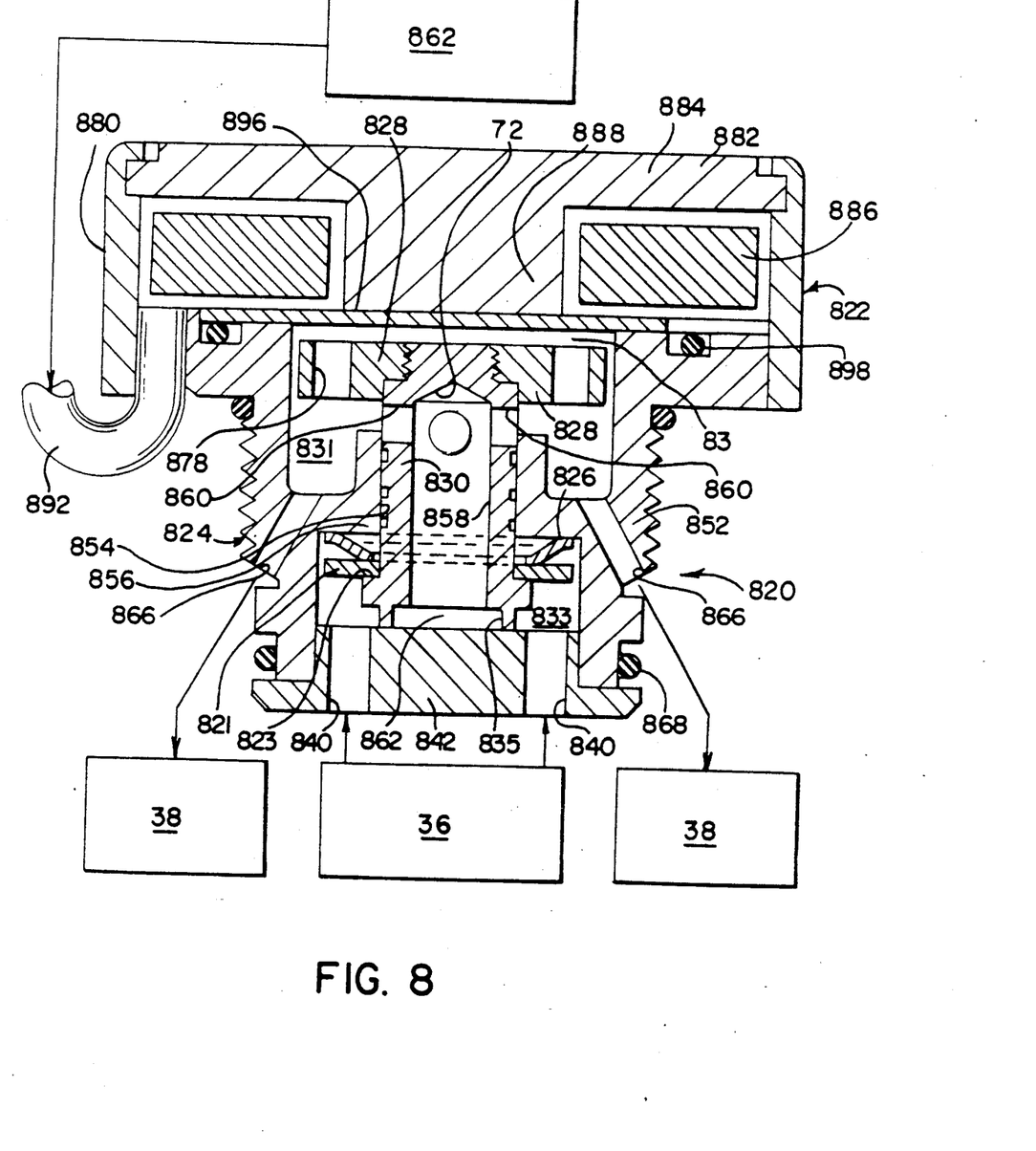
FIG. 8 is a view in section of a fifth embodiment of the invention, the view being similar to that illustrated in the related application Ser. No. 290,374, filed Dec. 29, 1988.

Referring now to FIG. 8, a compact hydraulic flow control valve 820 is shown. The valve 820 was originally disclosed in an earlier related application, Ser. No. 290,374, filed Dec. 29, 1988, and consists of a solenoid assembly 822 and a body member 824. Body 824 includes a valving mechanism that is constructed of a wave spring 826, a disc armature 828 and a regulating plunger 830. FIG. 8 schematically illustrates that energization and de-energization of the solenoid assembly 822 is controlled by control unit 862. Also, valve 820 uses a source of high pressure 36 at its inlet and an outlet to low pressure 38 as well. Valve 820 may be mounted in a vehicle shock absorber 26 as illustrated in FIG. 1. End cap 842 has inlet ports 840 which are designed to deliver fluid from the high pressure cavity 36.

The main body 852 of member 824 is generally cylindrical and has a central coaxial bore 854 extending between solenoid assembly 822 and end cap 842. Bore 854 has a central land 856 which, along with plunger 830, defines an upper chamber 831 and a lower chamber 833. Upper chamber 831 is connected to outlet channels 866. When valve 820 is mounted in a shock absorber 26, fluid may freely flow from upper chamber 831 via outlet channels 866 to the low pressure cavity 38.

Undesired fluid leakage between high pressure 36 and low pressure 38 is prevented by O-ring 868. Therefore, the only path for fluid flow between cavities 36 and 38 is from lower chamber 833 to upper chamber 831 via plunger 830. Plunger 830 has a central coaxial bore 858 leading to upper cross-bores 860 which are in fluid communication with upper chamber 831. Beneath bore 858, and defined by plunger ring 835, is a cylindrical space 862.

Disc armature 828 and plunger 830 operate as a single unit, moving between an upper open position, and a lower closed position shown in FIG. 8. Wave spring 826 normally biases the plunger 830 to its closed position. When the plunger 830 opens, fluid under pressure flows from chamber 833 to space 862 in a radially inward path, then up through plunger 830 to chamber 831.

Movement of plunger 830 is controlled by energization and de-energization of solenoid assembly 822 which creates a magnetic field that pulls armature 828 up toward solenoid 822 against the biasing force of spring 826 applied to ledge 823 of plunger 830 by washer 821.

Solenoid assembly 822 is mounted above member 824. Assembly 822 consists of a cap 884 having an upper disc-shaped section 882 held in place directly by the upper portion 880 of body 852. The lower section 888 of cap 884 is cylindrical and has a coil 886 surrounding it. In FIG. 8, coil 886 is connected by leads 892 to a pulse generator 862 designed to alternately energize and deenergize coil 886.

Upper portion 880 of body 852 and cap 884 hold coil 886 in place along with plate 896. Plate 896 and O-ring 898 seal and protect solenoid assembly 822 from pressurized fluid in upper chamber 831.

Figure 9:
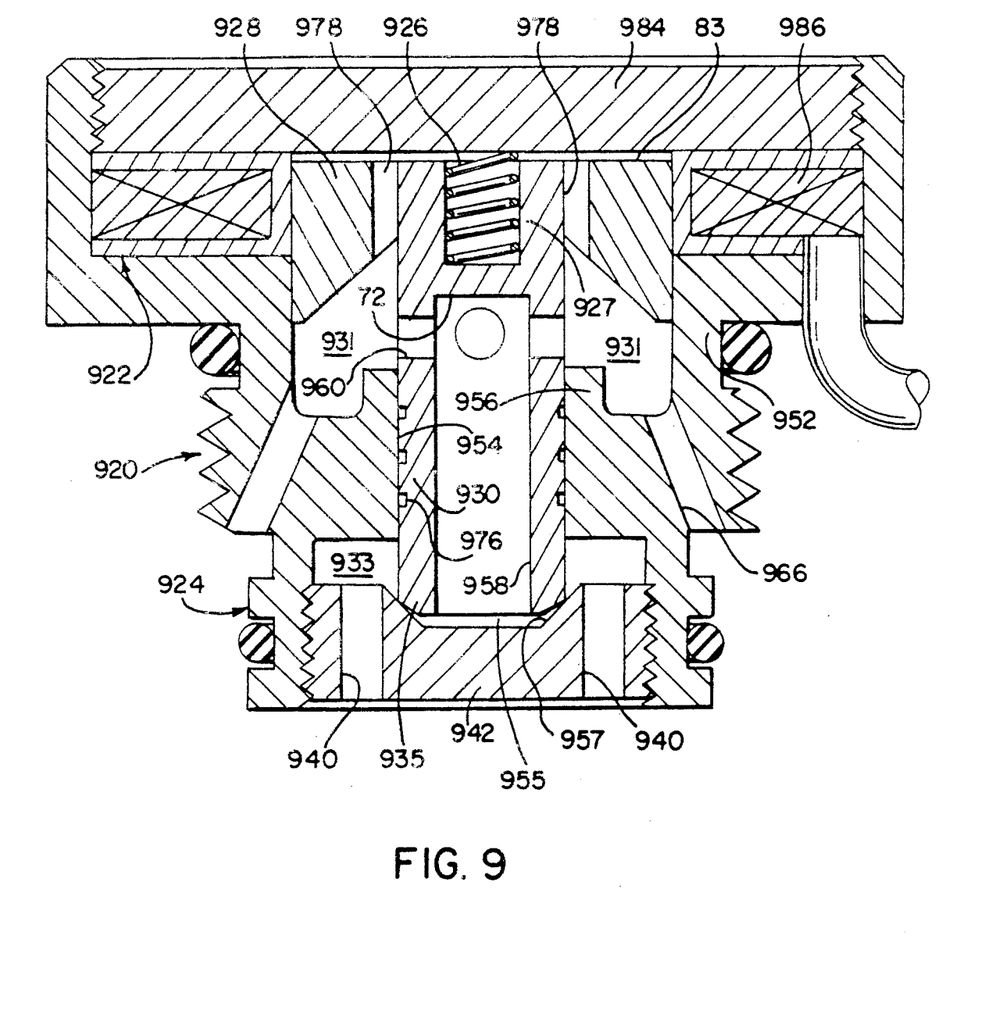
FIG. 9 is a view in section of a sixth embodiment of the invention, the view being similar to that illustrated in the related application Ser. No. 290,374, filed Dec. 29, 1988.

A further embodiment is illustrated in valve 920 of FIG. 9. This valve was also presented in the related application Ser. No. 290,374, filed Dec. 29, 1988. The valve 920 includes a solenoid assembly 922, a body member 924, an armature 928 and a regulating plunger 930. Fluid is admitted through inlet ports 940 in end cap 942. Main body 952 has a central bore 954 and land 956 defining upper chamber 931 and lower chamber 933. Outlet channels 966 permit fluid to exit the valve 920 from upper chamber 931.

The valve 920 of FIG. 9 permits fluid flow when plunger 930 is in its upper open position. Armature 928 now occupies approximately the same position occupied by lower cap section 888 of FIG. 8. Consequently, coil 986 generally surrounds armature 928, thereby still effectively utilizing the magnetic field generated by coil 986, while further reducing the size of the valve.

End cap 942 has inlet ports 940 passing through it to a lower chamber 933 defined by land 956 and plunger 930. However, end cap 942 now has a frusto-conical indentation 955 with side wall 957 having an inclination of 45° to horizontal.

The lower portion of plunger 930 is designed to be accommodated by indentation 955. The lower end of plunger 930 has a beveled lip 935 forming an angle of 30° with the horizontal. When plunger 930 is seated, a line seal is formed with the side wall 957. When plunger 930 is in its upper position in bore 954, fluid flows from lower chamber 933 to upper chamber 931 through the central bore 958 of the plunger.

Several advantages are realized with this seating configuration. The machining needed is extremely simple and inexpensive compared to other constructions. The line seal is also less contamination sensitive and less sensitive to viscosity changes, fluid flow forces and turbulence. The conical seating arrangement provides guided seating for repetitive operation. Finally, because the sealing diameter and seating diameter are the same, unseating is not a problem.

Plunger 930 is biased downward by a spring 926 which is now located in an upper section 927 of plunger 930. This construction improves the magnetic performance characteristics of the armature 928. Armature 928 has several holes 978 for fluid flow between cap 984 and upper chamber 931.

Valve 820 of FIG. 8 and valve 920 of FIG. 9 operate in substantially the same manner. For purposes of this explanation, it will be assumed that the valves 820 and 920 are used to alter or otherwise control the damping characteristics of a shock absorber 26 having a high pressure cavity 36, and a low pressure cavity 38 designed to accept fluid during compression. FIG. 1 shows such a mounting configuration.

Normally, plunger 930 is biased closed so that the line seal between plunger 930 and side wall 957 is in place. If solenoid assembly 922 remains deenergized during compression of the shock absorber 26, the damping characteristics of shock absorber 26 are maintained without alteration.

The seating arrangement of FIG. 9 permits the greatest fluid flow possible with the least vertical movement of armature 928. In this way, a large flow of pressurized fluid (to decrease damping of shock absorber 26) is achieved while minimizing the space and response time needed in valve 920 for armature 928 and plunger 930 to open.

When the damping of shock absorber 26 is to be decreased, solenoid assembly 922 is modulated to allow fluid flow in a predetermined fashion. The coil 986 and other elements of solenoid assembly 922 create an improved magnetic circuit. The coil shape and its proximity to armature 928 yield a greater motive force with less current than earlier devices. There is also considerably less magnetic flux leakage than in earlier devices. This is important because one of the primary objects of this valve 920 is to achieve the fastest response time possible between solenoid energization and armature/plunger movement.

Armature 928 is also specially designed to accomplish maximum efficiency and fast response times. One or more holes 978 are drilled through armature 928 for several reasons. First, holes 978 reduce any suction or adhesion impeding or delaying movement of armature 928 away from cap 984 when solenoid 922 is de-energized. Further, holes 978 reduce the weight of armature 928, and therefore momentum and inertia, to increase response time. Finally, holes 978 provide additional flow paths for fluid being displaced during movement of armature 928 in either direction.

Plunger 930 and armature 928 are designed to minimize the size of the valve while enhancing the response time. Response time is improved by one other feature. A number of notches 976 surround the outer surface of plunger 930. Notches 976 provide hydraulic balancing forces to keep plunger 930 centered in bore 954. Without these balancing forces, hydraulic forces would push plunger 930 horizontally against the wall of bore 954, thereby holding plunger 930 statically in bore 954. While some minimal leakage can occur, it is insignificant with respect to the valve's efficient operation.

When solenoid 922 is modulated, a controlled flow travel path for pressurized fluid is provided. Armature 928 is magnetically reciprocated, moving plunger 930 between its open and closed positions rapidly. This movement is rapid and covers only a very short distance; but the disc valve and annular opening configuration of the conical side wall 957 and beveled plunger lip 935 mean that appreciable flow rates can nevertheless be achieved. Modulation of solenoid 922 can be controlled by a variety of devices—a microprocessor, analog controls, and others.

The valves 820 and 920 (FIGS. 8 and 9) are structured to balance the hydraulic flow forces acting on their respective plungers 830 and 930 in accordance with Equation 1. In valve 920, for instance, the spring force results form the spring 926 acting between cap 984 and the plunger 930. The Bernoulli force results as fluid from inlet ports 940 passes radially inward between the beveled lip 935 and the conical side wall 957. Both the spring force and the Bernoulli force tend to move the plunger 930 toward the end cap 942.

The coil, momentum and differential pressure forces tend to open the valve 920. Energization of the solenoid assembly 922 creates a flux path passing through the armature 928 and tending to unseat the plunger 930. The momentum force results as fluid moving longitudinally through the central bore 958 encounters pressure wall 72. Finally, there is a differential pressure force acting on the plunger 930 because the fluid undergoes a pressure drop as it passes radially outward through cross bores 960. The lower pressure fluid may enter a damping chamber 83 through holes 978. Balancing the hydraulic flow forces allows the valves 820 and 920 to operate at higher flow rates, without increasing the size of the valve or the magnitude of the holding current.

The foregoing detailed description has been for the purpose of illustration. Thus, a number of modifications and changes may be made without departing from the spirit and scope of the present invention. For example, the position of the outlet ports within the housing and the position of the cross bores within the poppet may be modified. Likewise, the armature and the poppet may be integrally formed rather than being two separate components. Therefore, the invention should not be limited by the specific embodiments described, but only by the claims.

We claim:

1. A valve, comprising:
a housing having a main bore, inlet and outlet ports in communication with the main bore, and an end portion;
a poppet slidably mounted in the main bore, the poppet having:
a sealing end;
an opposite end;
a longitudinal central bore open at the sealing end and terminating in a pressure wall; and
a radial cross bore providing fluid communication between the central bore and the outlet port;
a valve seat sized to receive the sealing end of the poppet and prevent fluid communication between the inlet port and the central bore when the sealing end of the poppet is in contact with the valve seat;
means for biasing the poppet so that the sealing end contacts the valve seat and the opposite end is spaced apart from the end portion of the housing, the space between the opposite end of the poppet and the end portion of the housing forming a damping chamber;
means for channeling fluid between the central bore and the damping chamber; and
an actuator operable in response to an input current to produce a magnetic flux path tending to move the poppet out of contact with the valve seat;
wherein:
the sealing end of the poppet has an outer beveled edge; and
the valve seat has a frusto-conical surface, the surface designed to accept the beveled edge to prevent fluid communication between the inlet port and the central bore when the beveled edge is in contact with the surface.

2. The valve of claim 1, wherein the valve seat is formed in a sealing ring and the sealing ring is capable of limited radial movement relative to the housing.

3. The valve of claim 1, wherein the beveled edge forms an angle of 30 degrees with the horizontal and the frusto-conical surface forms an angle of 45 degrees with the horizontal.

4. A valve, comprising:
a housing having a main bore, inlet and outlet ports in communication with the main bore, and an end portion;
a poppet slidably mounted in the main bore, the poppet having:
a sealing end;
an opposite end;
a longitudinal central bore open at the sealing end and terminating in a pressure wall; and
a radial cross bore providing fluid communication between the central bore and the outlet port;
a valve seat sized to receive the sealing end of the poppet and prevent fluid communication between the inlet port and the central bore when the sealing end of the poppet is in contact with the valve seat;
means for biasing the poppet so that the sealing end contacts the valve seat and the opposite end is spaced apart from the end portion of the housing, the space between the opposite end of the poppet and the end portion of the housing forming a damping chamber;
means for channeling fluid between the central bore and the damping chamber; and
an actuator operable in response to an input current to produce a magnetic flux path tending to move the poppet out of contact with the valve seat;
wherein the valve seat is formed in a sealing ring and the sealing ring is capable of limited radial movement relative to the housing.

5. A valve, comprising:
a housing having a main bore, inlet and outlet ports in communication with the main bore, and an end portion;
a poppet slidably mounted in the main bore, the poppet having:
a sealing end;
an opposite end;
a longitudinal central bore open at the sealing end and terminating in a pressure wall; and
a radial cross bore providing fluid communication between the central bore and the outlet port;
a valve seat sized to receive the sealing end of the poppet and prevent fluid communication between the inlet port and the central bore when the sealing end of the poppet is in contact with the valve seat;
means for biasing the poppet so that the sealing end contacts the valve seat and the opposite end is spaced apart from the end portion of the housing, the space between the opposite end of the poppet and the end portion of the housing forming a damping chamber;
means for channeling fluid between the central bore and the damping chamber; and
an actuator operable in response to an input current to produce a magnetic flux path tending to move the poppet out of contact with the valve seat;
wherein:
the housing includes an expanded bore portion;
the valve further includes an armature fastened to the poppet and movable within the expanded bore portion; and
the magnetic flux path of the actuator passes through the armature.

6. The valve of claim 5, wherein the means for channeling fluid between the central bore and the damping chamber is at least one orifice extending through the armature.

7. The valve of claim 6, wherein the housing has an orifice providing fluid communication between one of the outlet ports and the expanded bore portion of the housing.

8. A valve, comprising:

a housing having a main bore, inlet and outlet ports in communication with the main bore, and an end portion;

a poppet slidably mounted in the main bore, the poppet having:
  a sealing end;
  an opposite end;
  a longitudinal central bore open at the sealing end and terminating in a pressure wall; and
  a radial cross bore providing fluid communication between the central bore and the outlet port;

a valve seat sized to receive the sealing end of the poppet and prevent fluid communication between the inlet port and the central bore when the sealing end of the poppet is in contact with the valve seat;

means for biasing the poppet so that the sealing end contacts the valve seat and the opposite end is spaced apart from the end portion of the housing, the space between the opposite end of the poppet and the end portion of the housing forming a damping chamber;

means for channeling fluid between the central bore and the damping chamber; and an actuator operable in response to an input current to produce a magnetic flux path tending to move the poppet out of contact with the valve seat;

wherein the means for channeling fluid between the central bore and the damping chamber includes a sensing pin fastened to the pressure wall of the poppet and projecting into the central bore, the sensing pin having conduits to provide fluid communication between the central bore and the damping chamber.

9. The valve of claim 8, wherein the conduits include a radial bore and an axial bore, the radial bore of the sensing pin being axially aligned with the radial cross bore of the poppet.

10. A valve, comprising:
a housing having a main bore and inlet and outlet ports in communication with the main bore;
a poppet slidably mounted in the main bore, the poppet having:
  a sealing end;
  an opposite end positioned within a damping chamber;
  a longitudinal central bore open at the sealing end and terminating in a pressure wall, the pressure wall having an opening therethrough; and
  a radial cross bore providing fluid communication between the central bore and the outlet port;
a valve seat sized to receive the sealing end of the poppet and prevent fluid communication between the inlet port and the central bore when the sealing end of the poppet is in contact with the valve seat;
a sensing pin mounted within the opening through the pressure wall, the sensing pin having conduits to provide fluid communication between the central bore and the damping chamber;
means for biasing the poppet so that the sealing end contacts the valve seat; and
an actuator operable in response to an input current to produce a magnetic flux path tending to move the poppet out of contact with the valve seat.

11. The valve of claim 10, wherein the valve seat is formed in a sealing ring and the sealing ring is capable of limited radial movement relative to the housing.

12. The valve of claim 10, wherein:
the sensing pin projects into the central bore of the poppet;
the conduits of the sensing pin include a radial bore and an axial bore; and
the radial bore of the sensing pin is axially aligned with the radial cross bore of the poppet.

13. The valve of claim 12, wherein:
the radial cross bore in the poppet forms a first edge and an opposite second edge, the first edge being closer to the pressure wall than the second edge; and
the axial position of the radial bore of the sensing pin between the first and second edges determines the amount of a momentum force field that is applied to the opposite end of the poppet.

14. The valve of claim 13, wherein the radial cross bore of the poppet is located adjacent the pressure wall.

15. A valve, comprising:
a housing having a main bore, an enlarged bore and inlet and outlet ports in communication with the main bore;
a poppet slidably mounted in the main bore, the poppet having:
  a sealing end;
  an opposite end;
  a longitudinal central bore open at the sealing end and terminating in a pressure wall; and
  a radial cross bore providing fluid communication between the central bore and the outlet port;
a valve seat sized to receive the sealing end of the poppet and prevent fluid communication between the inlet port and the central bore when the sealing end of the poppet is in contact with the valve seat;
a cap member secured to the housing;
means for biasing the poppet so that the sealing end contacts the valve seat and the opposite end is spaced apart from the cap member, the space between the opposite end of the poppet and the cap member forming a damping chamber;
an armature secured around the poppet and movable within the enlarged bore, the armature having an orifice passing through the armature and being in communication with the damping chamber; and
an actuator operable in response to an input current to produce a magnetic flux path passing through the armature and tending to move the poppet out of contact with the valve seat.

16. The valve of claim 15, wherein the valve seat is formed in a sealing ring and the sealing ring is capable of limited radial movement relative to the housing.

* * * * *